No. 885,249. PATENTED APR. 21, 1908.
J. C. HIGDON.
STEERING GEAR FOR AUTOMOBILES.
APPLICATION FILED DEC. 4, 1906.

ATTEST.
H. J. Fletcher.
M. C. Smith.

INVENTOR.
John Clark Higdon

UNITED STATES PATENT OFFICE.

JOHN CLARK HIGDON, OF ST. LOUIS, MISSOURI.

STEERING-GEAR FOR AUTOMOBILES.

No. 885,249.     Specification of Letters Patent.     Patented April 21, 1908.

Application filed December 4, 1906. Serial No. 346,331.

*To all whom it may concern:*

Be it known that I, JOHN CLARK HIGDON, a citizen of the United States, and resident of St. Louis, Missouri, have invented certain new and useful Improvements in Steering-Gears for Buggies or Automobiles, of which the following is a specification containing a full, clear, and exact description, reference being had to the accompanying drawings, forming a part hereof.

My invention relates to steering gears for buggies, or automobiles, of that class in which the front axle is in an integral piece, and is pivoted at the center of its length.

The object of my invention is to provide a simple and inexpensive steering attachment for the buggies now in common use, whereby the same may be quickly converted into automobiles without altering any part of the buggy.

Figure 1:
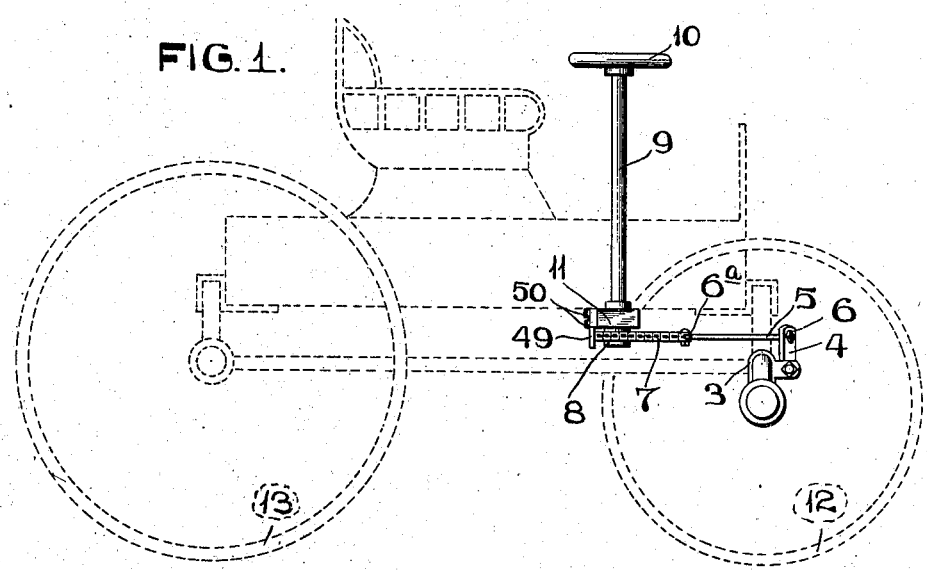
Figure 2:
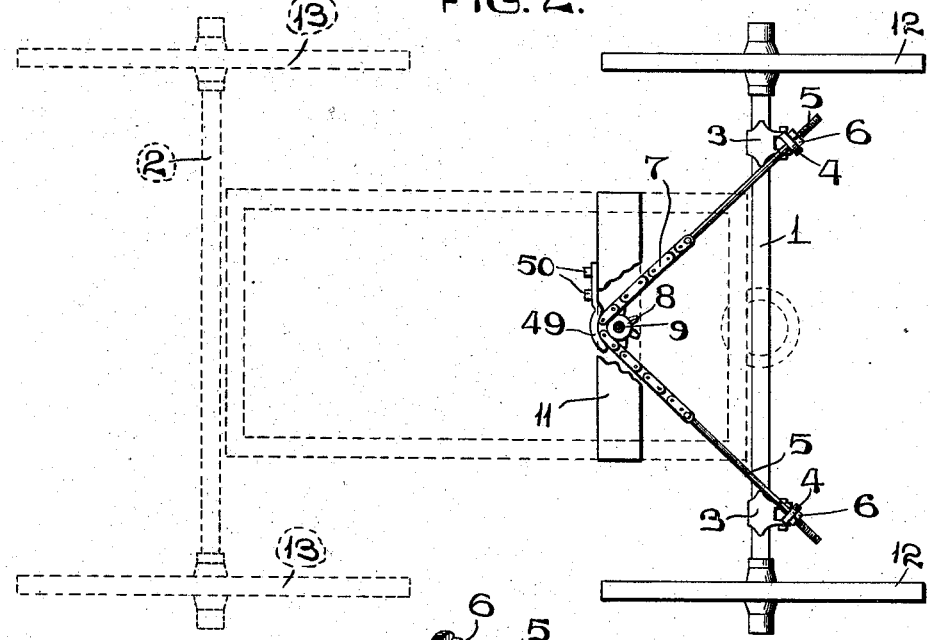
Figure 3:
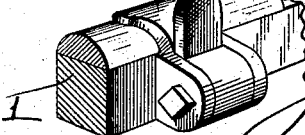

In the drawings:—Figure 1 is a side elevation showing an ordinary buggy in dotted lines, with my improved steering gear applied thereto; Fig. 2 is a plan view; Fig. 3 is a detail view of the thill coupling steering attachment.

Referring by numerals to the drawings:—1 and 2 respectively indicate the usual non-revoluble front and rear axles having the reach and springs supporting the usual body, although it will of course be understood that I do not confine myself to this form of running gear reach or body, and my attachment may as well be applied to any other form of vehicle now being propelled by animal power.

It will be observed that I have not changed any portion of the running gear or body, with the sole exception that I have omitted the usual shafts or tongue, and have fitted to the front axle one of the usual thill shackles 3, and short vertical steering stubs 4, which are twisted slightly inwardly and have a hole near their upper ends. Extending through the holes in the upper ends of the stubs 4 are steering rods 5 having their outer ends threaded, and provided with adjusting nuts 6 whereby said rods may be tightened or loosened. The inner ends of said rods 5 are preferably provided with an eye 6ª, or other suitable means for connecting the same to the common sprocket chain 7, which latter connects the inner ends of said steering rods, and passes over a sprocket wheel or pinion 8, which is fixed on the lower end of a steering post 9.

An ordinary steering wheel 10 is fixed upon the upper end of said steering post 9. Said steering post 9 is mounted in a suitable bearing centrally of a cross bar 11, extending across the bottom of the body at a point some distance in the rear of the vertical plane in which the front axle 1 is located, so that the said steering rods 5 and their chain 7, together with the front axle 1, form a figure approximating a triangle, and so that whenever said steering wheel is turned by the operator, said front axle 1 will be correspondingly moved, and the direction of the vehicle will be altered as the operator desires. The front wheels 12 and rear wheels 13 are of the usual form, and of comparatively large diameter, and are loosely mounted to rotate on the axles.

49 indicates a combined retainer and friction brake for the steering chain 7. This part 49 is preferably in the form of a flat steel spring, one end of which is secured to the cross bar 1 by means of bolts 50, and the free end of said part 49 is made to forcibly engage said chain 7, in order to hold the same firmly in position upon the steering pinion 8, and also for the purpose of retarding the movement thereof, as it is clear that by forcing said part 49 into contact with the chain, the movement of same will thereby be impeded an amount corresponding to the pressure imposed upon said chain by said part 49.

In operation, part 49 has proven highly efficacious, preventing sudden fluctuations of the steering wheel 10 when the front wheels 12 strike a large obstruction. In manipulating the steering wheel 10, the operator will of course understand that by turning the said wheel in one direction, the front axle 1 will be swiveled in a corresponding direction, and vice versa.

What I claim is:—

1. A steering gear for motor vehicles, the front axles of which swivel horizontally, comprising a steering post, arranged for operation in the body of the vehicle, a pinion fixed on the lower end of the steering post, a chain engaging the teeth of the pinion, connections between the ends of the chain and the outer portions of the swiveled axles, and a chain retainer fixed to the vehicle frame and adapted to hold said chain on said pinion.

2. The combination with a motor vehicle, the front axle of which is arranged to swing in a horizontal plane, of a steering post arranged for operation in the vehicle body, a pinion fixed on the lower end of the post, a chain engaging the teeth of the pinion, a resilient friction member fixed to the body of the vehicle and engaging the face of the chain directly opposite the pinion, clips fixed on the front axle adjacent the ends thereof, and rods connected to the ends of the chain and to the clips.

3. The combination with a motor vehicle, the front axle of which is arranged to swing in a horizontal plane, of a steering post arranged for rotation in the vehicle body, a handle fixed on the post, a pinion fixed on the lower end of the post, a chain engaging the teeth of the pinion, a resilient friction member fixed to the vehicle body and engaging the face of the chain adjacent the pinion, clips fixed on the front axle adjacent its ends, stubs detachably seated in the clips, rods adjustably connected at their outer ends to the stubs, and the inner ends of which rods are connected to the outer ends of the chain.

4. The combination with a motor vehicle, the front axle of which is arranged to swing in a horizontal plane, of a pinion arranged for rotation on the under side of the vehicle body at the approximate center thereof, a chain engaging the teeth of said pinion, connections between the ends of the chain and the front axle, a resilient friction member fixed at one end to the vehicle body, and its free end bearing against the face of the chain directly opposite the face engaged by the pinion, and means whereby the pinion is rotated.

In testimony whereof, I have signed my name to this specification, in presence of two subscribing witnesses.

JOHN CLARK HIGDON.

Witnesses:
M. P. SMITH,
E. L. WALLACE.